US010289295B2

(12) United States Patent
Crowther et al.

(10) Patent No.: US 10,289,295 B2
(45) Date of Patent: *May 14, 2019

(54) SCROLL SPEED CONTROL FOR DOCUMENT DISPLAY DEVICE

(71) Applicant: International Business Machines Corporation, Armonk, NY (US)

(72) Inventors: Fiona M. Crowther, Oldham (GB); Geza Geleji, Eastleigh (GB); Christopher J. Poole, Romsey (GB); Martin A. Ross, Gosport (GB); Craig H. Stirling, Hedge End (GB)

(73) Assignee: International Business Machines Corporation, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/877,230

(22) Filed: Oct. 7, 2015

(65) Prior Publication Data
US 2016/0179320 A1   Jun. 23, 2016

(30) Foreign Application Priority Data
Dec. 18, 2014  (GB) .................................. 1422571.8

(51) Int. Cl.
*G06F 3/0485* (2013.01)
*G06F 3/01* (2006.01)
(Continued)

(52) U.S. Cl.
CPC ............ *G06F 3/0485* (2013.01); *G06F 3/013* (2013.01); *G06F 3/0304* (2013.01); *G06F 3/0483* (2013.01); *G06F 15/0291* (2013.01)

(58) Field of Classification Search
CPC .... G06F 3/0485; G06F 3/0483; G06F 3/0304; G06F 15/0291
See application file for complete search history.

(56) References Cited

U.S. PATENT DOCUMENTS 6,886,137 B2   4/2005  Peck et al.
8,271,865 B1   9/2012  Bennett
(Continued)

FOREIGN PATENT DOCUMENTS

AU   2013200187 A1   1/2013
EP      2023269 A2   2/2009
(Continued)

OTHER PUBLICATIONS

IBM ("A Method for rate based scrolling of streaming data" Nov. 18, 2009).*
Crowther et al., "Scroll Speed Control for Document Display Device", U.S. Appl. No. 14/934,626, filed Nov. 6, 2015, 30 pages.
IBM, List of IBM Patents or Patent Applications Treated as Related, Appendix P, dated Nov. 6, 2015, 2 pages.
(Continued)

Primary Examiner — Sherrod L Keaton
(74) Attorney, Agent, or Firm — Anthony M. Pallone

(57) ABSTRACT

A computer-implemented method includes a display. The display is for displaying a document, including a plurality of document parts. The method includes an image capture device. The method categorizes each of the plurality of document parts based on a content of each of the plurality of document parts. The method captures images of a user using the image capture device. The method determines a plurality of reading speeds for each of the plurality of document parts. The plurality of reading speeds based on the images of the user for each of the plurality of document parts. The scrolling speed for each of the plurality of document parts is based on the plurality of reading speeds and the content for each of the plurality of document parts. The method scrolls the document via the display based on the plurality of scrolling speeds for each of the plurality of document parts.

14 Claims, 5 Drawing Sheets

(51) Int. Cl.
*G06F 15/02* (2006.01)
*G06F 3/03* (2006.01)
*G06F 3/0483* (2013.01)

(56) References Cited

U.S. PATENT DOCUMENTS

| | | | |
|---|---|---|---|
| 8,433,431 B1* | 4/2013 | Master | G10H 1/0008 |
| | | | 700/94 |
| 8,438,496 B1* | 5/2013 | Hegde | G06F 3/0485 |
| | | | 715/784 |
| 2002/0105482 A1 | 8/2002 | Lemelson et al. | |
| 2011/0130852 A1* | 6/2011 | Thorn | G06F 17/30029 |
| | | | 700/94 |
| 2012/0212407 A1 | 8/2012 | Tanaka | |
| 2013/0106674 A1 | 5/2013 | Wheeler et al. | |
| 2013/0152014 A1* | 6/2013 | Rabii | G06F 3/0485 |
| | | | 715/785 |
| 2014/0170615 A1 | 6/2014 | Cudak et al. | |

FOREIGN PATENT DOCUMENTS

| | | |
|---|---|---|
| EP | 1968008 B1 | 1/2012 |
| EP | 2629179 A1 | 8/2013 |
| GB | 2533366 A | 6/2016 |
| JP | 05323941 A | 12/1993 |
| JP | 2001282414 A | 10/2001 |
| WO | 03019341 A1 | 3/2003 |
| WO | 2013026725 A1 | 2/2013 |

OTHER PUBLICATIONS

Beymer et al., "WebGazeAnalyzer: A System for Capturing and Analyzing Web Reading Behavior Using Eye Gaze", IBM Almaden Research Center, 650 Harry Rd, San Jose, CA 95120, Presented at CHI 2005, Apr. 2-7, 2005, Portland, Oregon, USA, pp. 1-4.
Hohenstein et al., "Eye Movements Reveal Interplay Between Noun Capitalization and Word Class During Reading", Department of Psychology, University of Potsdam, Karl-Liebknecht-Str. 24/25, 14476 Potsdam, Germany, 2013, Proceedings of the 35th Annual Conference of the Cognitive Science Society, Austin, Texas, pp. 2554-2559.
"Coleman—Liau index", From Wikipedia, the free encyclopedia, this page last modified on Jul. 21, 2015, printed on Sep. 3, 2015, pp. 1-2.
"Methods of Controlling Document Display Devices and Document Display Devices", UK Patent Application No. 1422571.8, filed on Dec. 18, 2014, pp. 1-24.
"What is Smart Screen, and how do I use it on my Samsung Galaxy S4?", Samsung, pp. 1-3, printed on Sep. 3, 2015, © 2015 Samsung Electronics America, Inc., <http://www.samsung.com/us/support/answer/NS00044008/997407171>.
UK Search Report, IBM United Kingdom Limited, Ref. No. GB920140110GB1, Application No. GB1422571.8, dated Jun. 10, 2015, pp. 1-4.
IBM, "A Method for Rate-Based Scrolling of Streaming Data", an IP.com Prior Art Database Technical Disclosure, IP.com No. IPCOM000190154D, Publication Date: Nov. 18, 2009, pp. 1-3.

\* cited by examiner

SCROLL SPEED CONTROL FOR DOCUMENT DISPLAY DEVICE

FIELD OF THE INVENTION

The present invention relates generally to document display devices, and more particularly to scrolling speeds for document display devices.

BACKGROUND

Display devices are electronic visual displays for computers. Display devices may be made of a thin film transistor liquid crystal display thin panel, or made using a cathode ray tube. Display devices receive input from computers via VGA, DVI, DisplayPort, Thunderbolt, LVDS, or other proprietary connectors and signals. Display devices may present text documents or portions of text documents to a user. Users may make use of a scrolling mechanism to change the view on the display device. Some scrolling mechanisms automatically scroll through documents. Different users may read the text documents at a speed different than the scrolling mechanism and a user's reading speed may change at different points in a text document. Users continue to face difficulties with automated scrolling speeds.

WO 2013/026725 A1 published 28 Feb. 2013 discloses a "method for gaze-controlled text size control, and methods for gaze-based measuring of a text reading speed and of a number of visual saccades per text line."

US 2014/0170615 A1 published 19 Jun. 2014 discloses "a user-specific effort value associated with digital textual content."

WO 03/019341 A1 published 3 Jun. 2003 discloses "a rapid serial visual presentation (RSVP) display window in a mobile communication device to selectively adjust the presentation of text."

BRIEF SUMMARY OF THE INVENTION

A computer-implemented method includes a display. The display is for displaying a document. The document includes a plurality of document parts. The method includes an image capture device. The method displays one of the plurality of document parts document on the display. The method categorizes each of the plurality of document parts based on a content of each of the plurality of document parts. The method captures images of a user. The images of the user is captured by the image capture device. The method determines a plurality of reading speeds. The plurality of reading speeds is for each of the plurality of document parts. The plurality of reading speeds is based on the images of the user. The method determines a plurality of scrolling speed for each of the plurality of document parts. The scrolling speed for each of the plurality of document parts is based on the plurality of reading speeds and the content for each of the plurality of document parts. The method scrolls the document via the display based on the plurality of scrolling speeds for each of the plurality of document parts. A corresponding computer system and computer program product are disclosed.

DETAILED DESCRIPTION OF THE PREFERRED EMBODIMENTS

Figure 1:
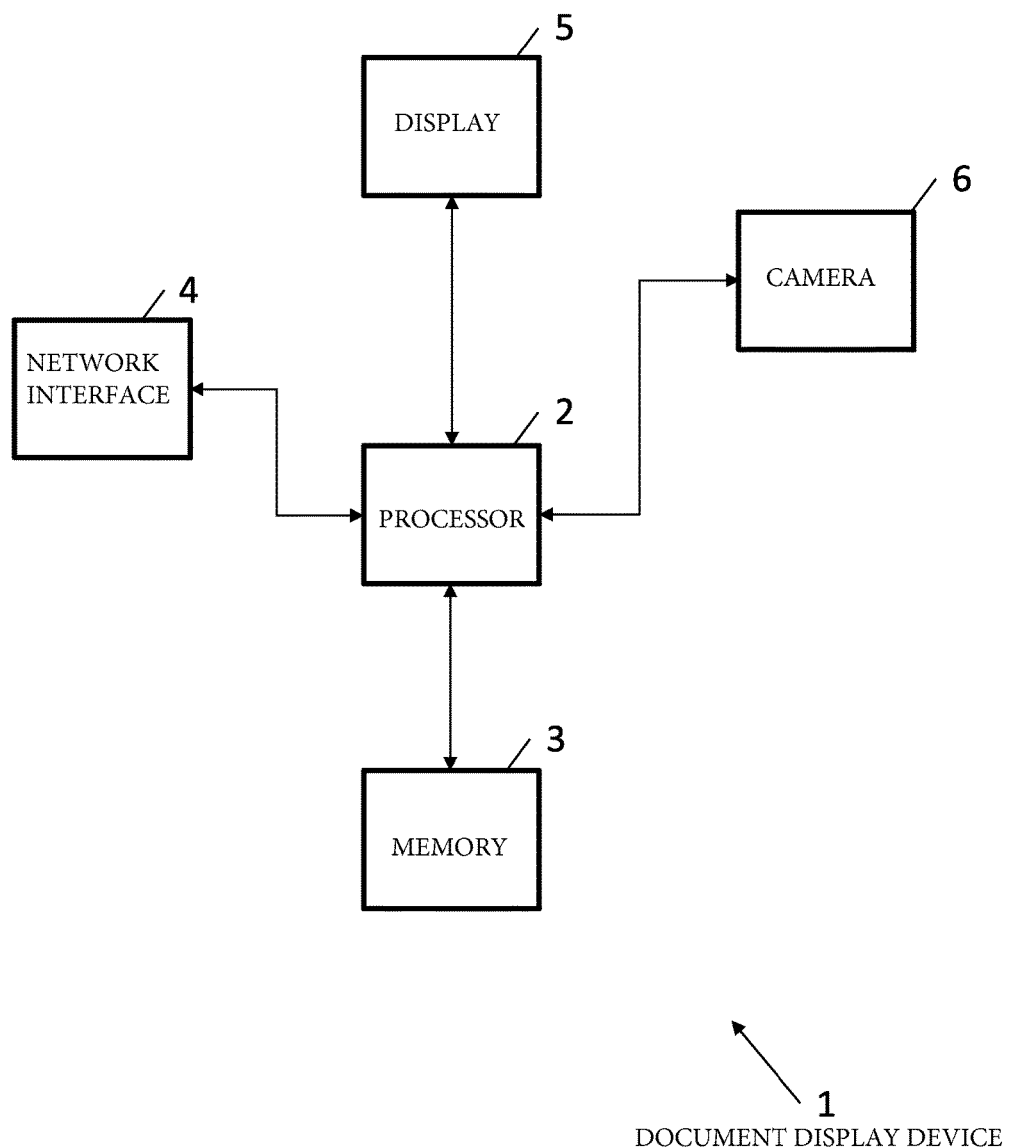
FIG. 1 is a block diagram of a document display device, in accordance with at least one embodiment of the present invention.

A document display device in accordance with an embodiment of the present invention is shown in FIG. 1. A document display device 1 includes a processor 2 in mutual communication with memory 3. The document display device 1 is also in mutual communication with a network interface 4, a display 5, and a camera 6.

The document display device 1 displays a document (not shown) to a user via the display 5. For most documents the display 5 will display only a portion of the document at any one time. Document data for the document is obtained via the network interface 4. For example, document data may be obtained from an external server or via the Internet. The document data is then stored in the memory 3, and rendered to display the document on the display 5.

Figure 2:
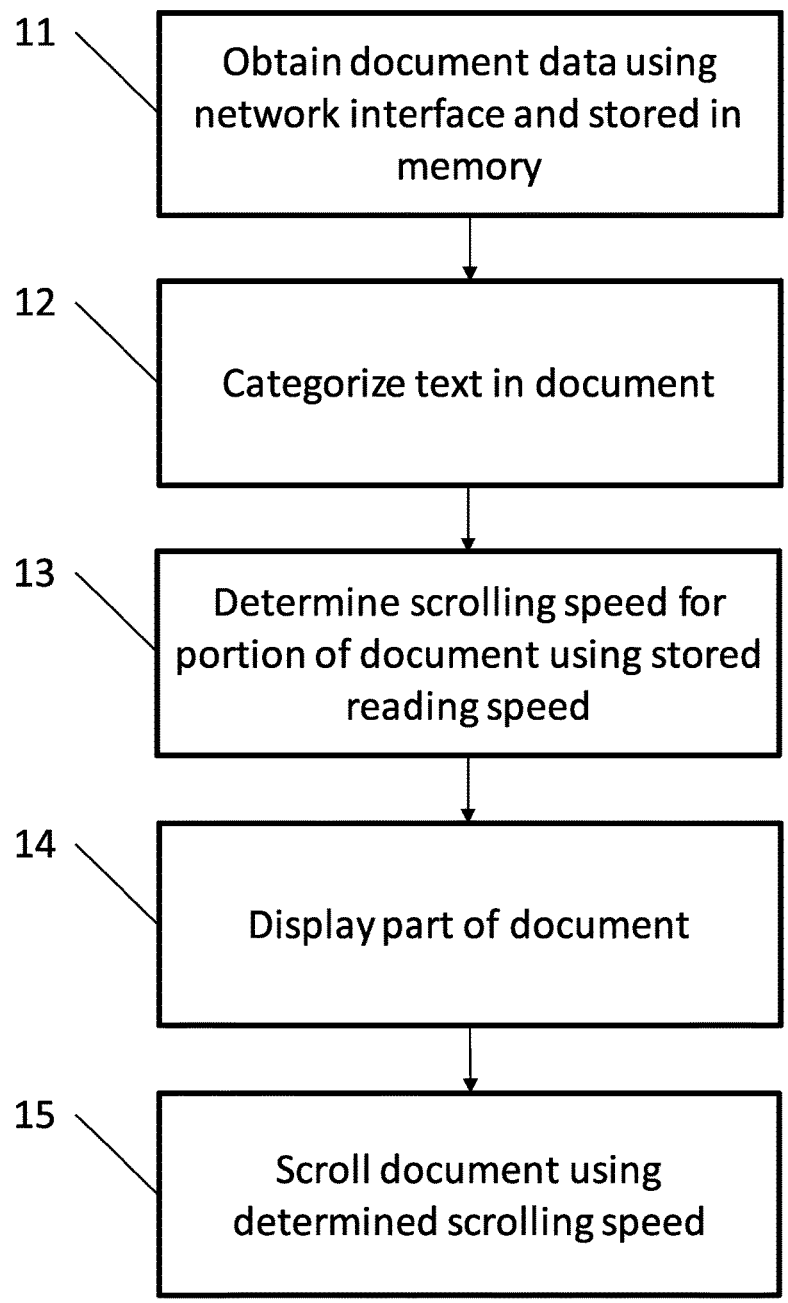
FIG. 2 is a flowchart depicting operational steps for a document display device when first displaying a document, in accordance with at least on embodiment of the present invention.

FIG. 2 is a flowchart depicting operational steps for the document display device 1 when first displaying a document. At step 11 the document data for the document is obtained using the network interface 4. The document data is stored in the memory 3. In some embodiments, FIG. 2 illustrates a computer-implemented method.

At step 12, text in the document, or at least a part provided by the document data obtained at step 11, is categorized. Different portions of the text may be categorized differently. The text or portions of the text may be categorized into various different categories, or a set of categories, for example the document display device 1 may categorize that a portion of the document is a picture. The document display device 1 may also categorize a portion of the document according to its readability. For example, the document display device 1 may identify portions of the document that use technical language or key phrases. The document display device 1 may also categorize portions of the document based on a predetermined threshold of word being above a predetermined length. The document display device 1 may also categorize that a portion of the document was not seen by a user. For example, the document display device 1 may access a camera. The camera may track eye movement of a user and indicate a user was looking away from the document and unable to see a portion of the document. The camera may see eye movement as an indication.

It will be appreciated that there are various known techniques for performing the above categorizations. For example, the document display device 1 may categorize portions of the document based on a statistical analysis of words used within the text or formatting used within the document. In addition, when the categorization of step 12 determines that a portion of the document consists of text that has not read by the user, the categorizations may be based upon a prior behavior of the user when reading documents. For example, if the prior behavior of the user has been to always skip past text of a certain type, text of this same type in the document can be categorized as text that is not read by the user.

At step 13 the document display device 1 determines a scrolling speed for portions of the document. The scrolling speeds are determined using the categorizations of the text and stored reading speeds for those types of text. The stored reading speeds may be determined from a user's previous behavior when reading documents containing text of those types. Alternatively and/or additionally, the stored reading speeds may be default/standard reading speeds for those types of text. The scrolling speeds are determined such that text of the document displayed on the display 5 will move in accordance with the user's reading speed, so that the user is not forced to wait for further text to appear on the display 5 for them to read, nor unable to read text as it is scrolled off the top of the display 5 before they are able to read it.

In the case that a portion of the document is categorized to be a picture, the reading speed for the picture can depend upon a picture size or a picture type. For example, a graph will take longer for a user to read than a small image.

At step 14, a part of the document is displayed on the display 5. At step 15, the document display device 1 scrolls through the document using the scrolling speed determined at step 13 to display and change which portion of the document is displayed by the display 5. In this way, the scrolling speed used when displaying the document is able to vary depending on the type of text being displayed. Further, as the display of the document progresses, when different types of text are displayed (i.e. portions of text that are categorized differently), different scrolling speeds can be used.

Figure 3:
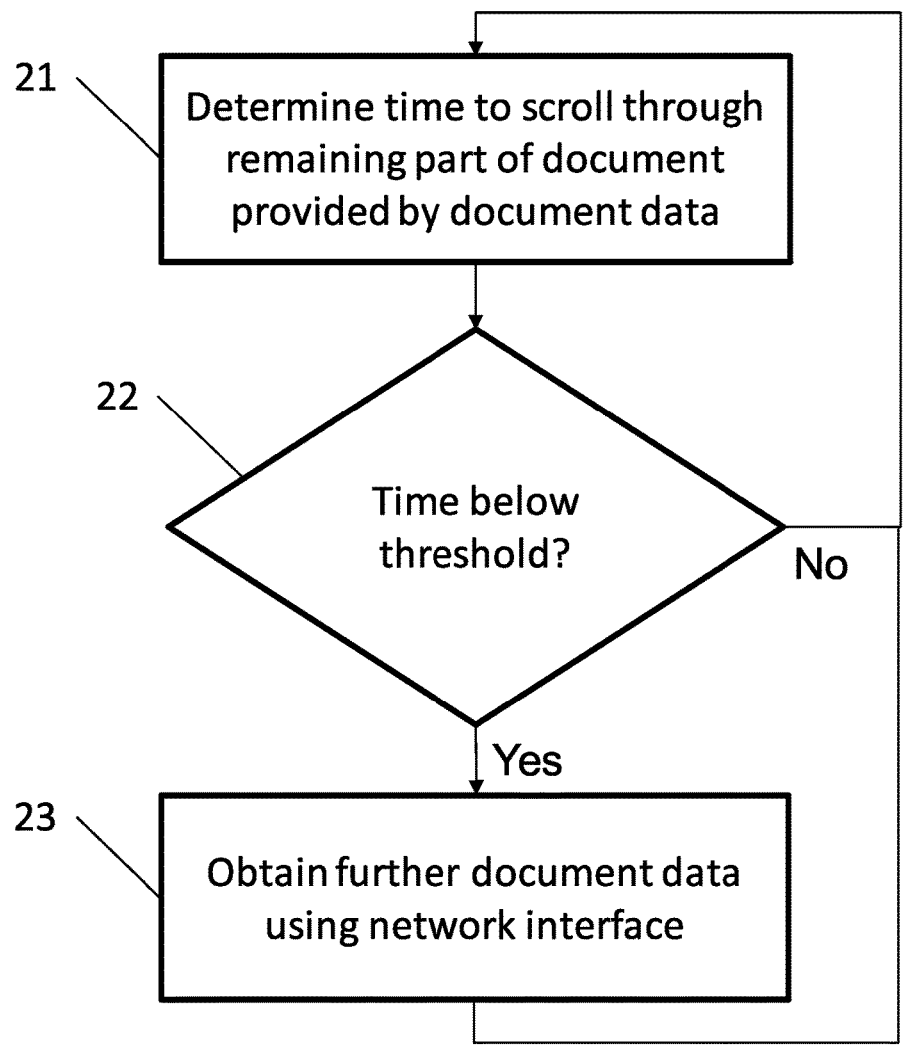
FIG. 3 is a flowchart depicting operational steps for a document display device when obtaining further document data, in accordance with at least one embodiment of the present invention.

FIG. 3 is a flowchart depicting operation of the document display device 1 when obtaining further document data. At step 21, the document display device 1 determines the time it will take for the user to read through the remaining portions of the document that are included in the document data and stored in the memory 3. In particular, the document display device 1 may determine the user's reading speed for the remaining portions of the document using the categorizations of the text and the stored reading speeds for the relevant text types determined at step 12 and at step 13.

At step 22 the document display device 1 determines whether the user's reading time is below a threshold. The threshold may be a pre-determined time period. In other embodiments, the threshold may be dependent upon the speed at which new document data may be obtained using the network interface 4. If the user's reading time is not below the threshold, the document display device 1 repeats the previous step 21 and determines the user's reading time for the remaining document data as the remaining document data may be different. As the document display device repeats the step 21 the document display device determines whether the user's reading time is below the threshold for a new remaining portion of the document. A person of ordinary skill in the arts will appreciate that such a determination may be done continuously while a document is being displayed, or may be done at suitable intervals, or in any other suitable manner.

If the document display device 1 determines, at step 22 that the user's reading time is below the threshold, the document display device 1 proceeds to step 23. At step 23, the display device 1 obtains further document data using the network interface 4. In this way, there is document data in the memory 3 to allow the document to be displayed when the document display device 1 scrolls to that portion of the document, but further document data is not obtained from the memory 3 until it is actually required.

It will be appreciated that in alternative embodiments it could be determined whether further document data is required using other criteria. For example, alternatively and/or additionally the document display device 1 could ensure that the amount of document data in the memory 3 does not fall below a threshold regardless of the determined user's reading time for the remaining data.

Figure 4:
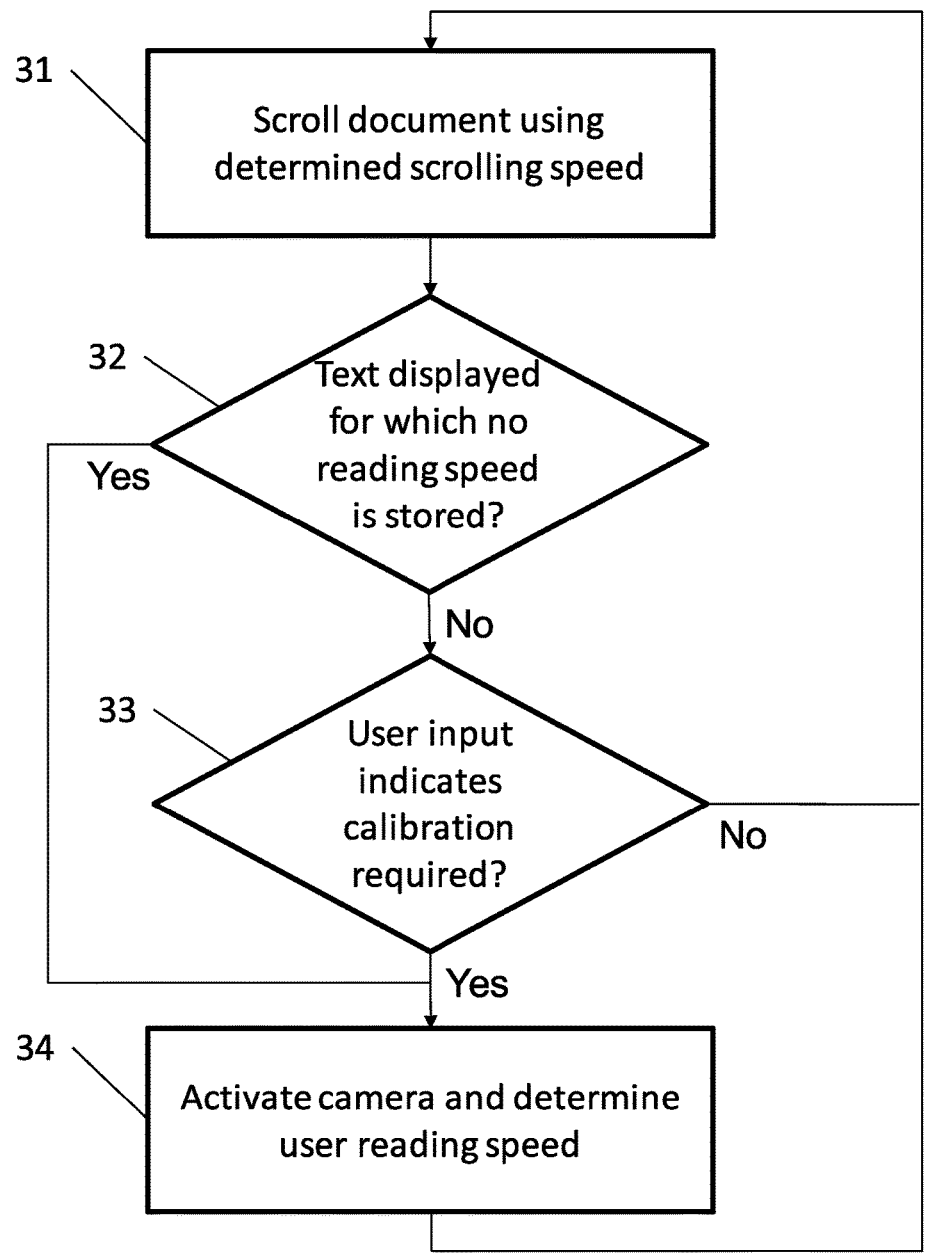
FIG. 4 is a flowchart depicting operational steps for a document display device when calibrating a user's reading speed, in accordance with at least one embodiment of the present invention.

FIG. 4 is a flowchart depicting operation of the document display device 1 when calibrating the user's reading speed. At step 31 the document display device 1 scrolls through the document using scrolling speeds determined at step 13. At step 32, the document display device 1 determines if there the reading speed has not been determined for the portion of the document that is being displayed by the display 5. If the document display device 1 determines that, yes, the reading speed has not been determined and is not stored within the memory 3, the document display device 1 proceeds to step 34.

If the document display device 1 determines that, no, the reading speed has been determined and is stored within the memory 3, the document display device 1 proceeds to step 33. It may be that an input from the user indicates that a calibration of the reading speed is required. The user may indicate this by explicitly selecting that the calibration occur, for example by pressing a "calibration" button. Alternatively and/or additionally the user indication may be implicit. For example, the user may manually change the scrolling speed, by pausing the scrolling, slowing it down or speeding it up. If, at step 33, the document display device 1 determines that, yes, calibration is required, the document display device 1 proceeds to step 34. If, at step 33, the display device 1 determines that, no, calibration is not required, the display device 1 returns to step 31.

At step 34, the camera 6 is activated to determine a user reading speed. The camera 6 may capture images of the user, in particular of the user's eyes. It will be appreciated that there are various known techniques for determining the reading speed of a user using the images captured by the camera 6, in particular by analyzing images of the user's eyes to determine which part of the display 5 the user is looking at. The document display device 1 may use the determined reading speed to adjust the stored reading speed for the portion of text being displayed, or to create a new reading speed to be stored within memory 3.

Figure 5:
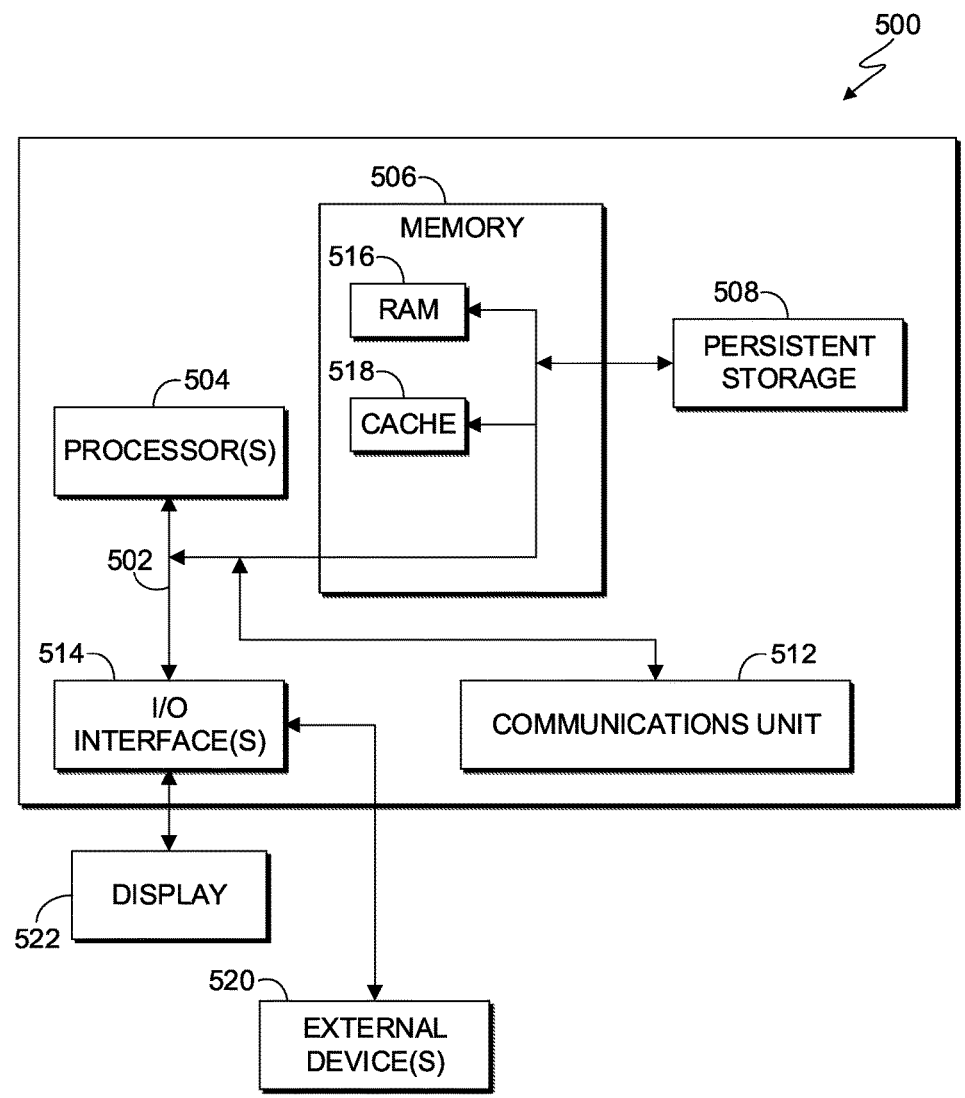
FIG. 5 is a block diagram of components of a computing apparatus suitable for executing the display program, in accordance with at least one embodiment of the present invention.

FIG. 5 is a block diagram depicting components of a computer 500 suitable for executing the document display device 1. FIG. 5 displays the computer 500, the one or more computer processor(s) 504 (including one or more processors), the communications fabric 502, the memory 506, the RAM, the cache 516, the persistent storage 508, the communications unit 510, the I/O interface(s) 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the computer processor(s) 504 (e.g. microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media or one or more computer readable media. The cache 516 is a fast memory that enhances the performance of computer processor(s) 504 by holding recently accessed data, and data near accessed data, from memory 506.

Program instructions and/or computer program instructions for the document display device 1 may be stored in the persistent storage 508 or in memory 506, or more generally, any computer readable storage media, for execution by one or more of the respective computer processor(s) 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The document display device 1 may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface(s) 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described and illustrated with reference to particular embodiments, it will be appreciated by those of ordinary skill in the art that the invention lends itself to many different variations not specifically illustrated herein.

For example, in an alternative embodiment all of the document data for the document is stored locally, for example in the internal storage of a mobile device, rather than obtained via a network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or control code written in any combination of one or more programming languages, including an control oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By categorizing the portions of the document, the scrolling speed can be determined by taking into account that the reading speed of the user can be different for different types of text. In particular, the reading speed of the user can be different for different types of text within the same document. This prevents an incorrect scrolling speed being used when different portions of a document contains texts of different types, or a document contains text of a different type to other documents from which a user's reading speed has been determined.

The document display device may be a personal computer, a mobile device such as a mobile telephone or tablet device, a teleprompter system or any other suitable document display device. The image capture device may be a camera.

Possible advantages include the categorizations of the one or more portions of the document, including categorizing that a portion is a picture. The picture may be a diagram containing minimal or no words. This categorization allows a slower scrolling speed to be determined for a picture, as pictures will take time to be viewed even if they contain no words. In the case of a diagram, the picture may require being read more slowly in comparison to a picture with no words or a block of text with a comparable number of words.

Possible advantages include, the categorizations of the one or more portions of the document. Such categorizations may include one or more of: categorizing the readability of a portion, categorizing that a portion uses technical language, categorizing that a portion contains a greater number of words with a predetermined length than a predetermined threshold, categorizing that a portion contains one or more predetermined words and/or phrases, and categorizing that a portion consists of text that is not read by the user. These are types of text that are typically read at different speeds by a user.

Possible advantages include, the document displaying device 1 including a memory for storing document data for the document. The document displaying device 1 may use the memory by determining an amount of document data from the determined categorizations of the one or more portions of the document and the determined reading speed of the user, obtaining the amount of document data for the document, and storing the obtained document data in the memory for subsequent display of the document. This allows document data to be obtained and stored for subsequently display (i.e. "buffered"), with the determination of reading speed for different types of text allowing the amount required for buffering to be more accurately determined.

Possible advantages include, a method of storing the determined reading speed of the user for at least one determined categorization of a portion of the document. In such an embodiment, the scrolling speed for the document may be determined using the stored reading speed of the user. This allows previously-determined reading speeds for a user to be used as soon as a document is displayed, and the previously-determined reading speeds can be used to provide more accurate determination of reading speeds over time.

Possible advantages include, the document display device 1 determining when to activate the image capture device using a determined categorization for a portion of the document displayed on the display. This may allow the image capture device to be inactive when not required, for example when a reading speed for the type of text being displayed in already known. This may reduce energy consumption. In this case, the image capture device is activated when a reading speed has not yet been determined for the portion of the document displayed on the display.

Possible advantages include, the document display device 1 activating the image capture device in response to an input to the device from the user. The image capture device is capable of capturing images. In some embodiments, the input of the user may indicate that the scrolling speed of the document should be calibrated. In such an embodiment, a user may indicate when the image capture device should be used to determine their reading speed, for example, by indicating that the current scrolling speed is too fast or too slow and therefore indicating that the determined reading speed is incorrect. In other embodiments, the user input may adjust the scrolling speed of the document, directly decreasing or increasing the scrolling speed. This may indicate that the current scrolling speed is incorrect, and the document display device 1 will calibrate the scrolling speed, doing so responsive to the user input.

In other embodiments, the document display device 1 may include a display for displaying a document and an image capture device. In such an embodiment, the document display device may be arranged to display a part of a document on the display, categorize a portion of the document containing a displayed part of the document, by analyzing the content of the portion being displayed, determine the reading speed of a user, by analyzing images of the user captured by the image capture device, determine a scrolling speed for the portion of the document using the determined categorizations of the portion of the document and the determined reading speed of the user, and scroll the part of the document displayed on the display in accordance with the determined scrolling speed.

Possible advantages include, the document display device 1 accessing a memory storage device which stores document data for the document. In such an embodiment, the document display device 1 may determine an amount of document data from the determined categorizations of the one or more portions of the document and the determined reading speed of the user, obtain the amount of document data for the document, store the obtained document data in the memory for subsequent display of the document.

In some embodiments, the document display device 1 may store the determined reading speed of the user for at least one determined categorization of a portion of the document. In such an embodiment, the scrolling speed for the document is determined using the stored reading speed of the user.

Possible advantages include, the document display device 1 is further arranged to determine when to activate the image capture device using the determined categorization of a portion of the document displayed on the display. In this case, preferably the image capture device is activated when there is no stored determined reading speed for the determined categorization of the portion of the document displayed on the display.

Possible advantages include, the document display device 1 activating an image capture device in response to an input from a user. An image capture device may be initiated responsive to input from a user. In such an embodiment, the input from the user may indicate that the scrolling speed of the document should be calibrated. Alternatively, the input of the user may adjust the scrolling speed of the document.

In some embodiments, the document display device 1 is provided a computer program product for controlling the document display device 1. In such an embodiment, the computer program product comprising a computer-readable storage medium having computer-readable program code embodied therewith, the computer-readable program code configured to perform any of the methods described above.

In some embodiments, the document display device 1 is provided a computer program product for controlling the document display device 1. In such an embodiment, the computer program product comprising a computer-readable storage medium having computer-readable program code embodied therewith, the computer-readable program code configured when executed on a computer system to provide any of the devices described above.

It will of course be appreciated that features described in relation to one aspect of the present invention may be incorporated into other aspects of the present invention. For example, the method of the invention may incorporate any of the features described with reference to the apparatus of the invention and vice versa.

What is claimed is:

1. A computer program product comprising:
   one or more computer readable tangible storage devices, wherein said one or more computer readable tangible storage devices are hardware, and program instructions stored on at least one of said one or more computer readable tangible storage devices, said program instructions comprising instructions to:
   obtain a first document data via a network, wherein the first document data comprises a plurality of document parts;
   store the first document data within a memory;
   categorize each of the plurality of document parts based on a content of each of the plurality of document parts;
   determine a plurality of scrolling speeds for each of the plurality of document parts, the scrolling speed for each of the plurality of document parts being based on a category for each of the plurality of document parts and a stored default reading speed for each category;
   determine a time to scroll through the first document data;
   determine the time to scroll through the first document data is below a threshold, wherein the threshold is based on a time to obtain a next document data via the network;
   while the time to scroll through the first document data is below the threshold:
     obtain the next document data via the network; and
     append the next document data to the first document data within the memory such that the time to scroll through the first document data is above the threshold;
   display the first document data on the display;
   scroll the first document data via the display at a speed based on the plurality of scrolling speeds for each of the plurality of document parts;
   capture images of a user, the images of the user being captured by an image capture device in response to an indication for calibration provided by the user;
   determine a plurality of reading speeds, each of the plurality of reading speeds being for each of the plurality of document parts, the plurality of reading speeds being based on the images of said user; and
   update the plurality of scrolling speeds for each of the plurality of document parts based on the plurality of reading speeds and the category for each of the plurality of document parts.

2. The computer program product of claim 1, wherein said content of each of said plurality of document parts is from a set of categories, said set of categories including instructions to categorize one of said plurality of document parts as a picture.

3. The computer program product of claim 2, wherein said set of categories includes instructions to:
- categorize readability of one of said plurality of document parts;
- categorize that one of said plurality of document parts uses technical language;
- categorize that one of said plurality of document parts contains a greater number of words with a predetermined length than a predetermined threshold;
- categorize that one of said plurality of document parts contains one or more predetermined words and/or phrases; and
- categorize that one of said plurality of document parts consists of text that has not been read by the user.

4. The computer program product of claim 2, wherein instructions to scroll said first document data via said display is based on said plurality of scrolling speeds for each of said plurality of document parts and said set of categories.

5. A computer system comprising:
- one or more computer processors;
- one or more computer readable memories;
- one or more computer readable tangible storage devices;
- computer program instructions; and
- said computer program instructions being stored on at least one of said one or more computer readable tangible storage devices for execution by at least one of said one or more processors via at least one of said one or more computer readable memories, said computer program instructions comprising instructions to:
  - obtain a first document data via a network, wherein the first document data comprises a plurality of document parts;
  - store the first document data within a memory;
  - categorize each of the plurality of document parts based on a content of each of the plurality of document parts;
  - determine a plurality of scrolling speeds for each of the plurality of document parts, the scrolling speed for each of the plurality of document parts being based on a category for each of the plurality of document parts and a stored default reading speed for each category;
  - determine a time to scroll through the first document data;
  - determine the time to scroll through the first document data is below a threshold, wherein the threshold is based on a time to obtain a next document data via the network;
  - while the time to scroll through the first document data is below the threshold:
    - obtain the next document data via the network; and
    - append the next document data to the first document data within the memory such that the time to scroll through the first document data is above the threshold;
  - display the first document data on the display;
  - scroll the first document data via the display at a speed based on the plurality of scrolling speeds for each of the plurality of document parts;
  - capture images of a user, the images of the user being captured by an image capture device in response to an indication for calibration provided by the user; determine a plurality of reading speeds, each of the plurality of reading speeds being for each of the plurality of document parts, the plurality of reading speeds being based on the images of said user; and
  - update the plurality of scrolling speeds for each of the plurality of document parts based on the plurality of reading speeds and the category for each of the plurality of document parts.

6. The computer system of claim 5, wherein said content of each of said plurality of document parts is from a set of categories, said set of categories including instructions to categorize one of said plurality of document parts as a picture.

7. The computer system of claim 6, wherein said set of categories includes instructions to:
- categorize readability of one of said plurality of document parts;
- categorize that one of said plurality of document parts uses technical language;
- categorize that one of said plurality of document parts contains a greater number of words with a predetermined length than a predetermined threshold;
- categorize that one of said plurality of document parts contains one or more predetermined words and/or phrases; and
- categorize that one of said plurality of document parts consists of text that has not been read by the user.

8. The computer system of claim 6, wherein instructions to scroll said first document data via said display is based on said plurality of scrolling speeds for each of said plurality of document parts and said set of categories.

9. The computer program product of claim 1, wherein the time to scroll through the first document data being based on the plurality of reading speeds and the content for each of the plurality of document parts.

10. The computer system of claim 5, wherein the time to scroll through the first document data being based on the plurality of reading speeds and the content for each of the plurality of document parts.

11. The computer program product of claim 1, wherein the next document data comprises a next plurality of document parts.

12. The computer program product of claim 11, further comprising:
- categorizing each of the next plurality of document parts based on a content of each of the next plurality of document parts.

13. The computer system of claim 5, wherein the next document data comprises a next plurality of document parts.

14. The computer system of claim 13, further comprising:
- categorizing each of the next plurality of document parts based on a content of each of the next plurality of document parts.

* * * * *